United States Patent
Parmantier et al.

(10) Patent No.: US 11,510,417 B2
(45) Date of Patent: *Nov. 29, 2022

(54) PHYSICALLY STABLE LIQUEFIED BLUE CHEESE COMPOSITION AND PROCESS FOR MAKING IT

(71) Applicant: NESTEC S.A., Vevey (CH)

(72) Inventors: Claude Parmantier, Glos (FR); Elodie Audrey Soussan, Le Breuil en Auge (FR); Praveen Upreti, Twinsburg, OH (US)

(73) Assignee: Societe des Produits Nestle S.A., Vevey (CH)

( * ) Notice: Subject to any disclaimer, the term of this patent is extended or adjusted under 35 U.S.C. 154(b) by 3 days.

This patent is subject to a terminal disclaimer.

(21) Appl. No.: 16/089,061

(22) PCT Filed: Mar. 16, 2017

(86) PCT No.: PCT/EP2017/056225
§ 371 (c)(1),
(2) Date: Sep. 27, 2018

(87) PCT Pub. No.: WO2017/167581
PCT Pub. Date: Oct. 5, 2017

(65) Prior Publication Data
US 2019/0124941 A1 May 2, 2019

Related U.S. Application Data

(60) Provisional application No. 62/315,154, filed on Mar. 30, 2016.

(30) Foreign Application Priority Data

Apr. 13, 2016 (EP) .................................... 16165000

(51) Int. Cl.
*A23C 19/09* (2006.01)
*A23C 19/068* (2006.01)
*A23C 19/08* (2006.01)

(52) U.S. Cl.
CPC ...... *A23C 19/0904* (2013.01); *A23C 19/0682* (2013.01); *A23C 19/08* (2013.01); *A23C 2250/05* (2013.01); *A23C 2250/30* (2013.01)

(58) Field of Classification Search
CPC . A23C 19/0682; A23C 19/08; A23C 19/0904; A23C 2250/05; A23C 2250/30
USPC .................... 426/580, 582, 519, 520, 522
See application file for complete search history.

(56) References Cited

U.S. PATENT DOCUMENTS

| 5,009,913 | A | * | 4/1991 | Ahmed | A23C 15/16 426/581 |
|---|---|---|---|---|---|
| 5,061,504 | A | | 10/1991 | Kong-Chan et al. | |
| 7,279,192 | B2 | | 10/2007 | Abboud et al. | |
| 8,815,322 | B2 | | 8/2014 | Kilroy | |
| 10,736,332 | B2 | * | 8/2020 | Upreti | A23C 19/076 |
| 2005/0271789 | A1 | * | 12/2005 | Merrill | A23C 19/0917 426/582 |
| 2009/0068311 | A1 | * | 3/2009 | Lucey | A23C 19/082 426/39 |
| 2011/0300259 | A1 | | 12/2011 | Heiman et al. | |
| 2017/0303556 | A1 | * | 10/2017 | Upreti | A23C 19/0904 |

FOREIGN PATENT DOCUMENTS

| WO | 2016050420 | 4/2016 |
| WO | 2016050844 | 4/2016 |

OTHER PUBLICATIONS

Talusani "Grilled Steaks with Blue Cheese and Chiles" Bon Appetit, Apr. 2005, Epicurious.com, 2 pages, XP002762348.

* cited by examiner

*Primary Examiner* — Leslie A Wong
(74) *Attorney, Agent, or Firm* — K&L Gates LLP

(57) ABSTRACT

The present invention relates to a process for preparing a liquid cheese composition comprising a blue cheese, a fresh cheese and a vegetable oil, wherein the liquid cheese composition does not comprise a food additive added beyond the food additives present in the cheeses. A further aspect of the present invention is the resulting blue cheese composition.

17 Claims, 4 Drawing Sheets

Before baking

After baking

Before baking

After baking

Before baking

Before baking

After baking

After baking

PHYSICALLY STABLE LIQUEFIED BLUE CHEESE COMPOSITION AND PROCESS FOR MAKING IT

CROSS REFERENCE TO RELATED APPLICATIONS

The present application is a National Stage of International Application No. PCT/EP2017/056225, filed on Mar. 16, 2017, which claims priority to U.S. Provisional Patent Application No. 62/315,154, filed on Mar. 30, 2016, and European Patent Application No. 16165000.7, filed on Apr. 13, 2016, the entire contents of which are being incorporated herein by reference.

The present invention relates to the processing of cheese and in particular to a process for liquefying a blue cheese to produce a fluid, physically stable high viscosity cheese product for industrial application. A further aspect of the present invention is the resulting blue cheese composition.

Cheese and processed cheese products are used industrially in the preparation of a large variety of different food products. Particularly, cheese is used in many of those food products as a topping to improve taste, indulgence and the appearance of the food product. Some prominent examples are pizza products as well as pasta with cheese products such as macaroni and cheese. Thereby, traditionally, blocks of cheese are shredded to small cheese snips or cut into pieces and those snips or pieces are then used to top the respective food products.

Alternatively, processed cheese has already been formed into smaller pieces or slices which can be used for example directly for topping such food products. The methods of processing cheese usually include the incorporation of artificial additives into the cheese mass. However, modern consumers shun from food products and food ingredients having additives from unnatural origin. Modern health-conscious consumers demand today a higher level of food product quality than ever, and seek to consume foods that are free from artificial, non-natural additives.

Furthermore, the use of solid cheese pieces or snips are not very easy to handle in an industrial factory setting as they produce a lot of waste, are difficult to transport and portion, and generally produce quite some mess around the cheese handling installations. The efficiency of modern high throughput processing and packaging machinery is therefore facilitated by using cheese products that are substantially fluid and can be pumped, poured and portioned as a fluid or paste directly onto the appropriate food products.

For example, WO 2008/122094 A1 discloses processes for liquefying cheese to produce a low viscosity product with enhanced such handling properties. Particularly, the document discloses that hard cheeses, such as cheddar cheese, and some soft cheeses, such as cottage and cream cheese, can be liquefied with water if run through specific heating step processes. No artificial substances have to be added to the cheese product. However, there is still an opportunity for improvement of the liquefied cheese product as to texture properties and stability of the composition over time.

Therefore, the object of the present invention is to improve the state of the art and to provide an improved or at least alternative solution to overcome at least some of the inconveniences described above. Particularly, the object of the present invention is to improve the texture properties, the viscosity and the stability of the liquefied cheese composition of the prior art, particularly when the objective is to liquefying blue cheeses.

The object of the present invention is achieved by the subject matter of the independent claims. The dependent claims further develop the idea of the present invention.

Accordingly, the present invention provides in a first aspect a liquid cheese composition comprising:
30-60 wt % blue cheese,
20-35 wt % fresh cheese,
2-12 wt % vegetable oil, and
a liquid aqueous component selected from water, milk and/or whey;
wherein the liquid cheese composition has a pH from 4.5 to 6.0, and a viscosity from 50,000 to 350,000 cP at a temperature of 8° C.; and
wherein the liquid cheese composition does not comprise a food additive added beyond the food additives present in the blue and/or fresh cheese.

A second aspect of the present invention relates to a process for preparing a liquid cheese composition of the present invention, comprising the steps of:
a) mixing the blue cheese, the fresh cheese, the vegetable oil and the aqueous component in a mixer;
b) heating the mixture of step a) to a temperature above 55° C.;
c) homogenizing the mixture of step a) at a temperature of above 55° C. and under pressure of at least 250 bars.

A third aspect of the invention relates to a food product made with use of the cheese composition according to the present invention.

While experiencing with making liquefied cheese products, the inventors have observed that liquefying blue cheeses typically results in liquefied cheese products which either contain many lumps of undissolved cheese mass, as if not properly liquefied, or an overall very liquid cheese mass, i.e. having a very low viscosity, if liquefied according to the technologies known from the prior art. Without wanting to be bound to theory, the inventors believe that this is the case because blue cheeses after ripening are interspersed with an extensive network of multicellular molds such as for example Penicillium. On one hand this typical physical network of multicellular molds holds together and contains areas of coagulated milk protein and cheese masses, and provides a structure which makes it more resistant and difficult to a smooth liquefaction process of the cheese mass as known from the prior art. On the other hand, the molds typically also produce and secrete a lot of protease and lipase enzymes which are usually not present in none-blue type cheese products. Those enzymes contribute to at least a partial hydrolysis of the blue cheese mass which contributes significantly to a liquefaction and low viscosity of said cheese mass once the network holding the cheese structure together collapses.

The inventors have now surprisingly found that when liquefying a blue cheese with water remarkable improvements of the liquefied cheese texture can be obtained when adding certain amounts of fresh cheese and oil to the blue cheese-water mixture and homogenizing the mixture at a temperature above ca. 55° C. and under pressure of at least 250 bars. Thereby, a smooth viscous liquid cheese composition can be obtained which is homogenous without substantial oiling out, which is stable for an extended period of time and which has a viscosity of at least 50,000 cP. For obtaining such a smooth viscous cheese composition it was not necessary to add any additional emulsifier, sequestering agent, texturing agent or humectant with the cheese composition.

Consequently, the advantage of the new process is that the resulting liquefied blue cheese product is smoother and firmer in texture, which allows for example an improved industrial application as well as an improved presentation of the cheese on a final food product, such as e.g. a pizza topped with said blue cheese product. Furthermore, the liquefied blue cheese is more stable and shows less spontaneous syneresis over time. Still furthermore, the liquefied blue cheese is made of all natural ingredients well recognized by consumers as natural and authentic. There are no additionally added artificial food additives in the liquid blue cheese composition which would be needed for emulsification or thickening purposes. The resulting product is 'clean label', meaning that the product does not contain any food additives which would need for example in Europe to be labelled with an E-number.

DETAILED DESCRIPTION OF THE INVENTION

Figure 1:
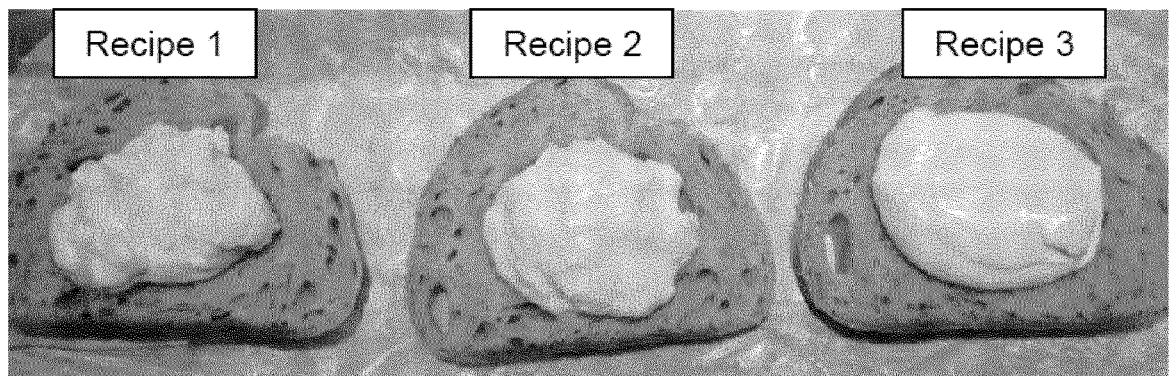
FIG. 1: Evaluation of consistencies of Recipes 1, 2, and 3 before and after baking.
Figure 1:
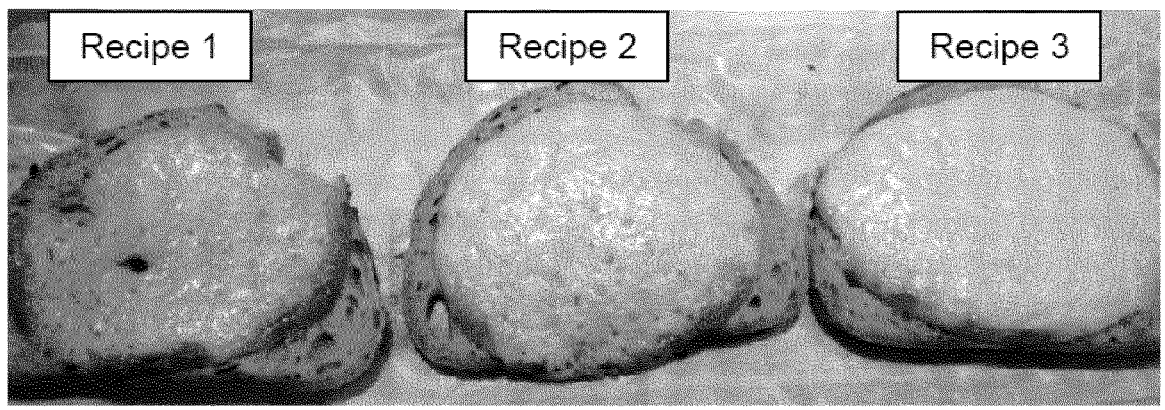

The present invention pertains to a liquid cheese composition comprising:
30-60 wt % blue cheese,
20-35 wt % fresh cheese,
2-12 wt % vegetable oil, and
a liquid aqueous component selected from water, milk and/or whey;
wherein the liquid cheese composition has a pH from 4.5 to 6.0, and a viscosity from 50,000 to 350,000 cP at a temperature of 8° C.; and
wherein the liquid cheese composition does not comprise a food additive added beyond the food additives present in the blue and/or fresh cheese.

In a preferred embodiment, the liquid cheese composition of the present invention is physically stable. "Physically stable" means that the composition has a homogeneous aspect and does not show phase separation or oiling out at room temperature for at least several hours. Preferably the liquid cheese composition is physically stable for at least one day, preferably for at least 1 week, 2 weeks or longer.

The term "blue cheese" of the present invention relates to any type of cheese that is made and/or ripened with the addition of a mold, typically a Penicillium mold. The blue cheese is typically spotted or veined throughout with blue or blue-grey mold. It generally carries a distinct smell that is due to the mold and to types of bacteria encouraged to grow on the cheese together with the mold.

"Fresh Cheese" of the present invention relates to any type of cheese that is made and ripened, if at all, in a relatively short time and has a soft, creamy or almost runny texture. For these cheeses, milk is curdled and drained with very little other processing.

"Viscosity" refers to a measure of the resistance of a fluid to gradual deformation by stress. It corresponds to the informal concept of thickness of a fluid. Viscosity is determined herein in cP, wherein 1 cP is equal 1 mPa·s. The term "food additive" of the present invention relates to substances added to a food product in order to add or enhance a certain function in said food product such as taste, texture, appearance. Originating in Europe, today, each food additive is assigned a unique number, termed E-number, which has now been adopted and extended by the Codex Alimentarius Commission to internationally identify all additives, regardless of whether they are approved for food use at a National level.

In one embodiment, the present invention relates to the absence of a food additive from the liquid cheese composition of the present invention, wherein the food additive is a non-dairy food compound. "Non-dairy" in this context means that the additive is not naturally found in milk.

As of the present invention, the food additive is an emulsifier, a sequestering agent, a texturing agent, a humectant and/or a milk protein replacer. Particularly, the food additive is one of the group consisting of melting salts, starches, gums, celluloses, alginates, chelating agents, phosphate salts, citrate salts, pectin, gelatin, agar, glycerol, polyol, egg proteins and soy proteins. Preferably, the cheese composition of the present invention does not comprise an added non-milk based emulsifier, stabilizer and/or thickener, wherein for example such emulsifier, stabilizer and/or thickener is selected from the group consisting of melting salts, xanthan gum, gum Arabic, guar gum, locust bean gum, cellulose, alginate, pectin, agar, carrageenan, starch, lecithin, mono- and diglycerides of fatty acids, esters of fatty acids, sorbitol, glycerol, polysorbate, konjac, cassia gum and gelatin, or a combination thereof. Modern consumers do not like to have food ingredients with a lot of artificial, non-natural additives. Hence, advantageously, the present embodiment relates to an all-natural cheese composition which is presently much preferred by modern consumers, conscious of health and wishing to reduce artificial additives.

An advantage of not adding a food additive to the liquid cheese composition of the present invention is that the resulting product is 'clean label', meaning that the product does not contain food additives which would need for example in Europe to be labelled with an E-number. Today's consumers clearly prefer composite food products which are natural and made with natural ingredients, and which do not contain the addition of 'artificial' food additives.

In one embodiment, the blue cheese is selected from the group consisting of Roquefort, Gorgonzola, blue Stilton, Stichelton, and Bleu d'Auvergne, or a combination therefrom. Preferably the blue cheese is present in the liquid cheese composition of the present invention in an amount from 30-50 wt %, more preferably from 35-45 wt % of the total liquid cheese mass.

In another embodiment, the fresh cheese of the present invention is selected from the group consisting of cottage cheese, cream cheese, curd cheese, fromage blanc, goat cheese, ricotta, and mozzarella, or a combination therefrom. Preferably, the fresh cheese of the present invention is present in the liquid cheese composition in an amount from 25-35 wt % of the total liquid cheese mass.

In one embodiment, the vegetable oil of the present invention is selected from the group consisting of sunflower oil, safflower oil, rapeseed oil, corn oil, olive oil, soybean oil, peanut oil, palm oil and a combination thereof. Preferably, the vegetable oil is selected from a healthy oil having a low content of saturated fatty acids (SFA). Preferably the oil is selected from safflower oil, rapeseed oil or sunflower oil.

In one preferred embodiment, the vegetable oil is present in the liquid cheese composition of the present invention in an amount of 3.0-9.0 wt %, more preferably in an amount of 4.0-5.0 wt % of the total liquid cheese composition.

In one embodiment, the aqueous component is liquid milk or liquid whey. Preferably, the aqueous component is liquid skimmed milk.

In a preferred embodiment, the liquid cheese composition of the present invention has a pH from 4.5 to 6.0. Preferably, the pH is from 5.0 to 5.5.

In one embodiment, the liquid cheese composition according to the present invention has a total fat/oil content of the composition of less than 21 wt % of the composition, preferably of less than 19 wt % of the composition. Preferably, the liquid cheese composition of the present invention has a total content of saturated fatty acids of below 8 wt % of the composition. The term "fat" of the present invention refers to a lipid composition which is solid at 20° C.; the term "oil" of the present invention refers to a lipid composition which is liquid at 20° C. "Total fat/oil content" refers to the total amount of fats and oils in a said composition.

Healthy eating is presently one of the main trends worldwide, and the food industry has a growing interest in the development of new food products having less fat and oil, but still excellent organoleptic properties. Oil and Fat are important providers and carriers of taste and aroma, and it is difficult to maintain a similar good taste and aroma profile of a food product having little oil and fat than a same product having lots of oil and fat. The present invention now allows to reduce the amount of fat and/or oil in a cheese composition of the present invention if compared to an equal volume of none liquefied cheese. At the same time also total amounts of saturated fatty acids of such a liquefied cheese mass can be reduced.

The liquid cheese composition of the present invention has a viscosity from 50,000 to 350,000 cP at a temperature of 8° C. Preferably, the cheese composition of the present invention has a viscosity from 55,000 to 250,000 cP at a temperature of 8° C. It has been found by the inventors that these value ranges are optimal ranges for achieving a smooth, firm liquefied blue cheese product which does show minimal syneresis over time and does not give a gritty sensation on the tongue when consumed.

In a preferred embodiment, the liquid cheese composition of the present invention further comprises herbs and/or spices. This relates to an incorporation of herbs and/or spices directly into the liquefied cheese composition even before its application e.g. onto a food product. Advantageously then herbs and/or spices do not need to be applied separately onto such a food product, which would result in an additional production step, increasing complexity and costs of production. Furthermore, dosing of such herbs and/or spices would be much easier and more consistent for an industrial application. And still further, as the herbs and/or spices would not need to be applied anymore individually e.g. on a production line, the dust level generated by such an application would be drastically reduced.

Another aspect of the present invention relates to a process for preparing a liquid cheese composition of the present invention, comprising the steps of:

a) mixing the blue cheese, the fresh cheese, the vegetable oil and the aqueous component in a mixer;

b) heating the mixture of step a) to a temperature above 55° C.;

c) homogenizing the mixture of step a) at a temperature of above 55° C. and under pressure of at least 250 bars.

In a preferred embodiment, homogenizing the mixture in step c) of the present process is at a temperature of at least 65° C., more preferably of at least 70° C. Preferably, the homogenizing is not at a temperature above 121° C.

A preferred embodiment of the present invention is a process, wherein in step a) the aqueous component is either liquid skimmed milk or liquid whey, and where said aqueous component is mixed with the vegetable oil first before adding and mixing with the blue cheese and fresh cheese. The inventors have found that it is very convenient to first prepare an emulsion between the skimmed milk or liquid whey with the vegetable oil, before then mixing this emulsion with the blue and fresh cheese components. In this way a very homogenous and smooth liquid cheese composition can easily be obtained.

The present invention further pertains to a process which does not comprise a step of adding separately a food additive which can be an emulsifier, a stabilizer and/or a binder to the liquid cheese composition. Preferably, the process of the present invention does not comprise a step of adding a non-milk based emulsifier, stabilizer and/or binder selected for example from the group consisting of xanthan gum, gum Arabic, guar gum, locust bean gum, carboxymethyl cellulose, alginate, pectin, agar, carrageenan, gelatin, native starches, modified starches, lecithin, mono- and diglycerides of fatty acids, esters of fatty acids, sorbitol, glycerol, polysorbate, konjac, cassia gum or a combination thereof. Modern consumers do not like to have food ingredients with a lot of artificial, non-natural additives. Hence, advantageously, the present embodiment relates to a process for producing an all-natural liquid cheese composition which is presently much preferred by modern consumers, conscious of health and wishing to reduce artificial additives.

A still further embodiment is a process according to the present invention, comprising a step of adding herbs and/or spices. This allows incorporating herbs and/or spices directly into the cheese composition as part of the production process. A correct dosing of such herbs and/or spices is much easier as they are then not anymore in powdered form and can be dosed in usually much larger quantity batches. Furthermore, complexity and costs for applying herbs and/or spices onto a food product can be reduced considerably.

A still further aspect of the present invention pertains to a food product prepared with making use of the liquid cheese composition of the present invention. Preferably, the food product of the present invention is a pizza, a hot-pocket sandwich or a prepared dish, topped or containing the disclosed liquefied cheese composition.

Those skilled in the art will understand that they can freely combine all features of the present invention disclosed herein. In particular, features described for the product of the present invention may be combined with the process of the present invention and vice versa. Further, features described for different embodiments of the present invention may be combined. Further advantages and features of the present invention are apparent from the figures and examples.

Example 1: A blue cheese preparation was produced using the following ingredients:

Skim milk and oil blend: The blend was produced using a mixture of skimmed milk (70%) and vegetal oil (30%) at 40° C. The sunflower oil used had a saturated fat content of 10%. The mixture was homogenized in a bench scale piston-type homogenizer (APV Lab series Homogenizer) at different homogenization pressures. Among the different homogenization pressures tested (30, 50, 100, 200, 400, 500 bars), 400 bars homogenization pressure produced a highly texturized blend (pH=6.67). It was realized that the pressured below 200 bars, the blend was not stable for 4 days and exhibited phase separation during storage.

Fresh cheese: The fresh cheese (0% fat) was obtained from Lactalis (France) (pH=4.24).

Gorgonzola: The cheese was obtained from Bassi (Italy) (pH=5.48).

The above 3 ingredients/blends were mixed for 1 min at ambient temperature in a Thermomix at 3 different ratios (Table 1). Total and Saturated Fat content was calculated for each recipe; the pH and apparent viscosities were measured using a Brookfield viscometer (Table 1).

TABLE 1

Formulations of Recipe 1, 2, and 3 with physical-chemical parameters:

| Ingredients [%] | Recipe 1 | Recipe 2 | Recipe 3 |
| --- | --- | --- | --- |
| Gorgonzola | 60 | 50 | 40 |
| Fresh cheese | 20 | 25 | 30 |
| Skim milk:Oil blend (70:30) | 20 | 25 | 30 |
| SUM | 100 | 100 | 100 |
| % Fat (calculated) | 21 | 19.5 | 19 |
| % Saturated Fat (calculated) | 11.1 | 9.5 | 7.9 |
| pH | 5.34 | 5.28 | 5.22 |
| Brookfield viscosity D + 1, 8° C. (cP) | 340,000 | 187,000 | 112,000 |

The texture and consistency at a temperature of 15° C. after 1 day of storage are shown in FIG. 1. To assess their performance in baking conditions, the three cheese slurries were then baked in oven (160° C., 7 min) over crackers.

Based on the textural and baking performance evaluation, Recipe 3 was selected as the best recipe. The Recipe 3 was also recognized to have a significant organoleptic character of the Blue cheese, despite a high dilution (40% of Blue cheese).

Figure 4:
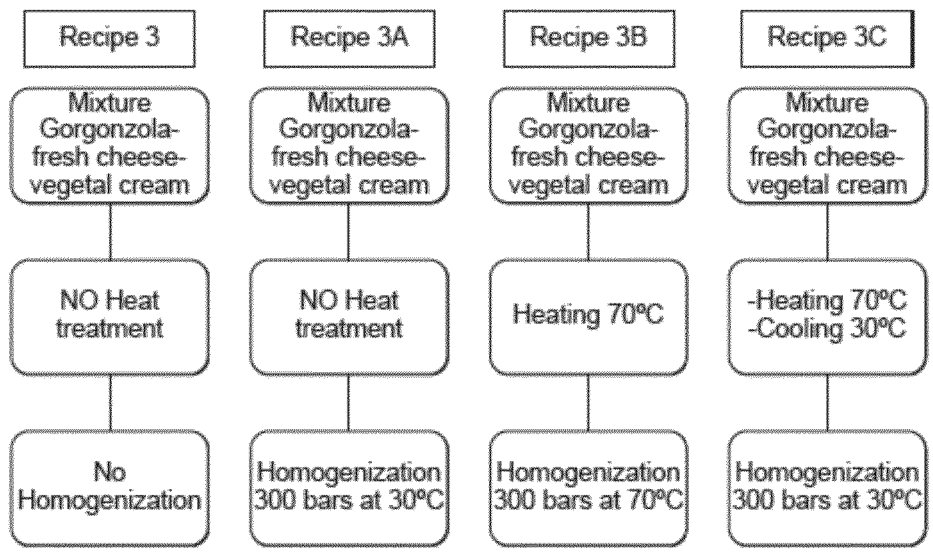
FIG. 4: Evaluation of the impact of homogenization and heat treatment of Recipes 3, 3A, 3B, and 3C.

Example 2. Recipe 3 from Example 1 was further evaluated for the impact of homogenization and heat treatment. Following experimental design was used as shown in FIG. 4:

Viscosity and pH of the recipes were measured (Table 2). As the uncertainty of measurement for the viscometer is 18%, the viscosities between the recipes were not different.

TABLE 2

Formulations of Recipe 3, 3A, 3B, and 3C with physical-chemical parameters:

| Analyte | Recipe 3 | Recipe 3A | Recipe 3B | Recipe 3C |
| --- | --- | --- | --- | --- |
| pH | 5.28 | 5.32 | 5.33 | 5.39 |
| Brookfield viscosity D + 1, 8° C. (cP) | 130'000 | 176'000 | 156'000 | 103'000 |

Figure 2:
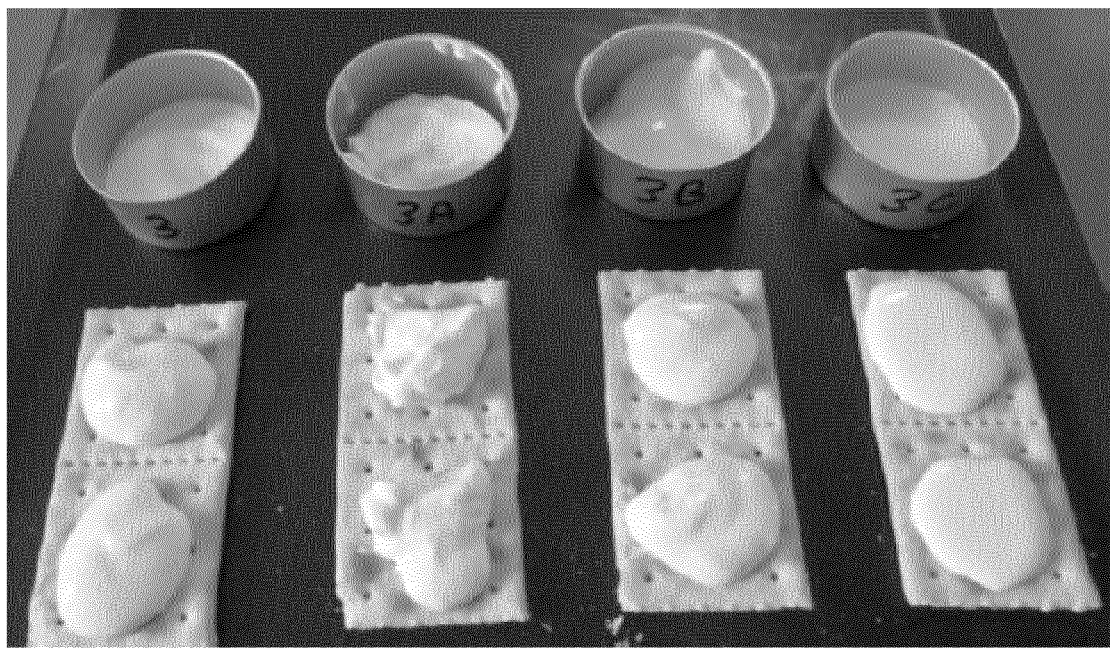
FIG. 2: Evaluation of consistencies of Recipes 3, 3A, 3B, and 3C before and after baking.
Figure 2:
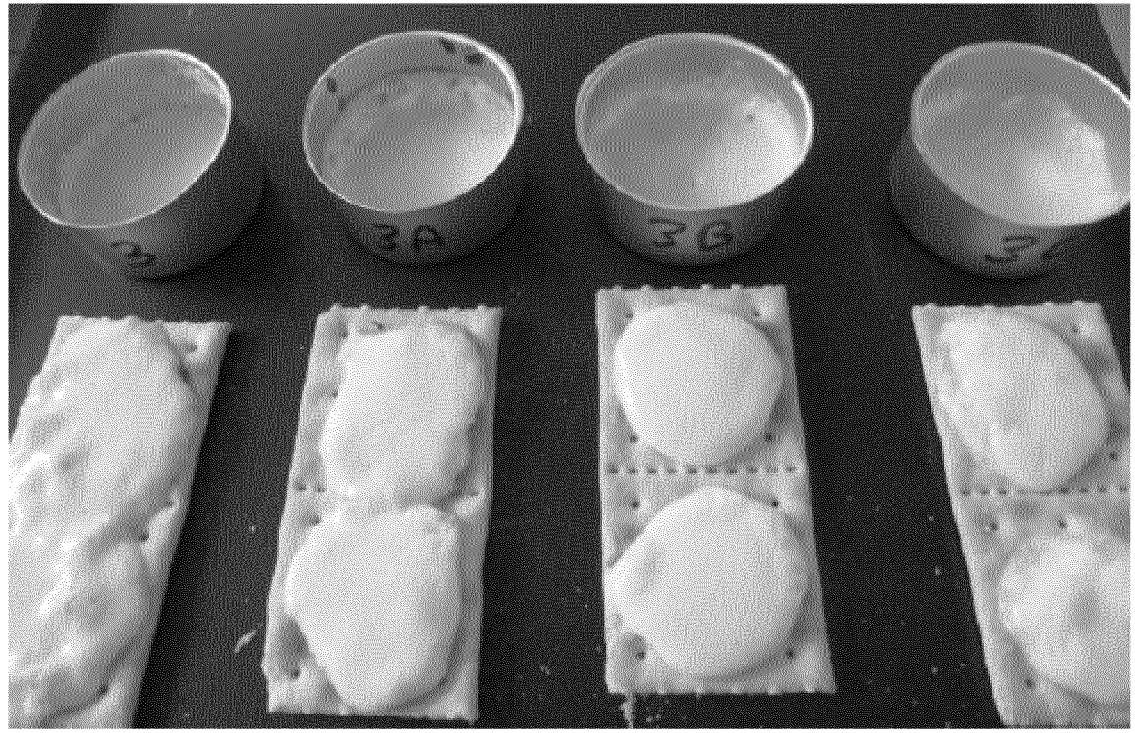

To assess the performance of the 4 cheese preparations under baking conditions, the preparations were baked in an oven (160° C., 7 min) after 1 day of manufacturing (FIG. 2). Compared to the homogenized samples, the recipe 3 was the only recipe that exhibited a phase separation of fat. The samples heat treated at 70° C. (recipe 3B and recipe 3C) showed a more smooth and shiny texture compared to recipe 3 and 3A. Based on the evaluation, Recipe 3B was recognized to be the optimal cheese preparation.

Example 3. Experiments were conducted to evaluate if the amount of oil can be reduced in the vegetable-oil blend to further reduce the fat and saturated-fat in the cheese preparations (Recipe 4 and 5). The recipes have been compared in Table 3.

TABLE 3

Formulations of Recipe 3B and 4 with physical-chemical parameters.

| Ingredient | Recipe 3B | Ingredient | Recipe 4 | Ingredient | Recipe 5 |
|---|---|---|---|---|---|
| Gorgonzola | 40 | Gorgonzola | 40 | Gorgonzola | 40 |
| Fresh cheese | 30 | Fresh cheese | 30 | Fresh cheese | 30 |
| Skim milk:Oil blend (70:30) | 30 | Skim milk:Oil blend (85:15) | 30 | Skimmed milk | 30 |
| SUM | 100 | SUM | 100 | SUM | 100 |
| % Fat (calculated) | 19 | % Fat (calculated) | 14.5 | % Fat (calculated) | 10 |
| % Saturated Fat (calculated) | 7.9 | % Saturated Fat (calculated) | 7.45 | % Saturated Fat (calculated) | 7.0 |
| pH | 5.30 | | 5.30 | | 5.32 |
| Brookfield viscosity D + 1, 8° C. (cP) | 201,000 | | 88,000 | | 23,600 |

A few more recipes were created to assess the effect of milk protein concentrate (MPC 85) on the texture of the reduced fat cheese composition. The recipes have been tabulated below (Table 4).

TABLE 4

Formulations of Recipe 7, 8, and 9 with physical-chemical parameters.

| Ingredient | Recipe 9 | Ingredient | Recipe 7 | Ingredient | Recipe 8 |
|---|---|---|---|---|---|
| Gorgonzola | 40 | Gorgonzola | 40 | Gorgonzola | 40 |
| Fresh cheese | 30 | Fresh cheese | 15 | Fresh cheese | 30 |
| Skim milk:Oil blend (70:30) | 7.5 | Skim milk:Oil blend (70:30) | 15 | Skim milk:Oil blend (70:30) | 0 |
| MPC 85 in milk 2.5% | 22.5 | MPC 85 in milk 2.5% | 30 | MPC 85 in milk 2.5% | 30 |
| SUM | 100 | SUM | 100 | SUM | 100 |
| % fat | 12.25 | % fat | 14.5 | % fat | 10 |
| % SFA | 7.225 | % SFA | 7.45 | % SFA | 7.0 |
| Brookfield viscosity D + 1, 8° C. (cP) | 77,200 | | 34,800 | | 28,400 |

Another recipe was created, where the Skim milk:oil blend was replaced with Crème Fraiche with 34% milk fat (i.e. 20% Saturated Fat) (Table 5).

TABLE 5

Formulation of Recipe 6 with physical-chemical parameters.

| Ingredient | Recipe 6 |
|---|---|
| Gorgonzola | 40 |
| Fresh cheese | 30 |
| Crème fraiche 34% | 30 |
| SUM | 100 |
| % fat | 20.2 |
| % SFA | 13 |
| pH | 5.33 |
| Brookfield viscosity D + 1, 8° C. (cP) | 165,600 |

Without the addition of milk protein concentrate, the viscosity of the cheese slurries at 14.5% (recipe 4) and 10% fat (recipe 5) decreased drastically compared to the reference at 19% fat (recipe 3B) (Table 3).

When MPC was added to the reduced fat cheese composition, the viscosity was not significantly different (recipe 8 versus recipe 5) (Table 4).

The viscosity of the cheese composition containing 30% crème fraiche (recipe 6) was slightly less viscous than our reference containing 30% of vegetable cream (recipe 3B) (Table 5).

To assess the performance of these recipes in baking conditions, the cheese preparations were baked in oven (160° C., 7 min) over the crackers.

Figure 3:
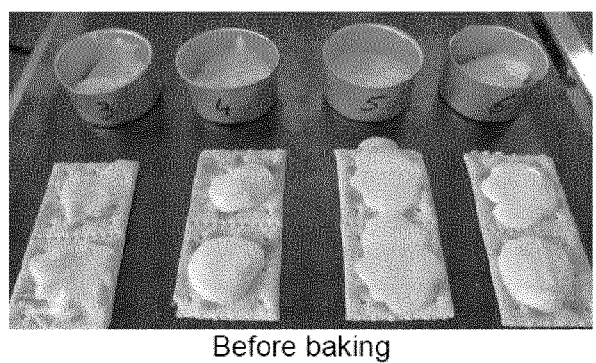
FIG. 3: Evaluation of consistencies of Recipes 3, 3B, 4, 5, 6, 7, 8, and 9 before and after baking.
Figure 3:
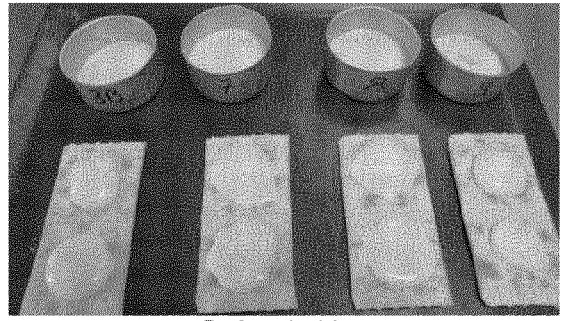
Figure 3:
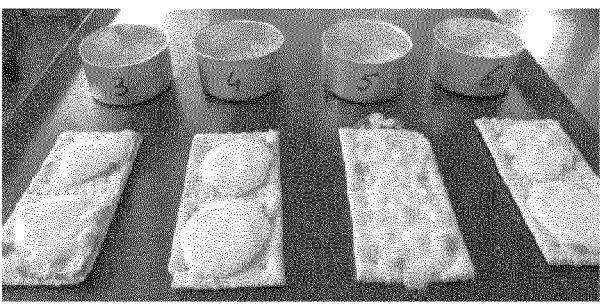
Figure 3:
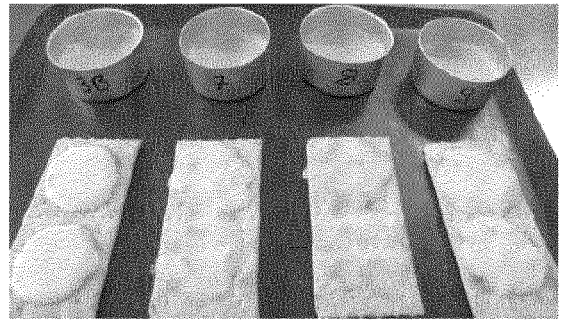

When MPC was added to the reduced fat cheese composition, the baking properties did not seem drastically different (recipe 8 versus recipe 5) (FIG. 3).

Out of all the "further reduced fat content recipes", the recipe 4 gave the best results in terms of organoleptic properties (sensory and appearance before/after cooking). Therefore, the best way to further reduce fat content in those cheese slurries is to reduce the quantity of sunflower oil in the vegetable cream.

The cheese composition containing 30% crème fraiche (recipe 6) was more yellowish than our reference containing 30% of vegetable cream (recipe 3B) after baking; although the taste was similar.

The invention claimed is:

1. A liquid cheese composition comprising:
   30-60 wt % blue cheese;
   20-35 wt % fresh cheese;
   2-12 wt % vegetable oil; and
   a liquid aqueous component selected from the group consisting of water, milk and whey;
   wherein the liquid cheese composition has a pH from 4.5 to 6.0, and a viscosity from 50,000 to 350,000 cP at a temperature of 8° C.; and
   wherein the liquid cheese composition does not comprise diglycerides.

2. The liquid cheese composition according to claim 1, wherein the blue cheese is selected from the group consisting of Roquefort, Gorgonzola, blue Stilton, Stichelton, Bleu d' Auvergne, and combinations therefrom.

3. The liquid cheese composition according to claim 1, wherein the fresh cheese is selected from the group consisting of cottage cheese, cream cheese, curd cheese, fromage blanc, goat cheese, ricotta, mozzarella, and combinations therefrom.

4. The liquid cheese composition according to claim 1, wherein the vegetable oil is selected from the group consisting of sunflower oil, safflower oil, rapeseed oil, corn oil, olive oil, soybean oil, peanut oil, palm oil and combinations thereof.

5. The liquid cheese composition according to claim 1, wherein the liquid aqueous component is liquid skimmed milk or liquid whey.

6. The liquid cheese composition according to claim 1 having a pH from 5.0 to 5.5.

7. The liquid cheese composition according to claim 1, wherein the total fat/oil content of the liquid cheese composition is less than 21 wt % of the composition.

8. The liquid cheese composition according to claim 1, wherein the total content of saturated fatty acids is below 8 wt % of the liquid cheese composition.

9. A process for preparing a liquid cheese composition comprising 30-60 wt % blue cheese, 20-35 wt % fresh cheese, 2-12 wt % vegetable oil, a liquid aqueous component selected from the group consisting of water, milk and whey, wherein the liquid cheese composition has a pH from 4.5 to 6.0, and a viscosity from 50,000 to 350,000 cP at a temperature of 8° C., and wherein the liquid cheese composition does not comprise diglycerides, the process comprising the steps of:
   a) mixing the blue cheese, the fresh cheese, the vegetable oil and the aqueous component in a mixer to form a mixture;
   b) heating the mixture of step a) to a temperature above 55° C.; and
   c) homogenizing the mixture of step a) at a temperature of above 55° C. and under pressure of at least 250 bars.

10. The process according to claim 1, wherein homogenizing the mixture in step c) is at a temperature of at least 65° C.

11. The process according to claim 1, wherein in step a) the aqueous component is liquid skimmed milk or liquid whey, and the liquid aqueous component is mixed with the vegetable oil first before adding and mixing with the blue cheese and the fresh cheese.

12. A food product comprising a liquid cheese composition comprising 30-60 wt % blue cheese, 20-35 wt % fresh cheese, 2-12 wt % vegetable oil, a liquid aqueous component selected from the group consisting of water, milk and whey, wherein the liquid cheese composition has a pH from 4.5 to 6.0, and a viscosity from 50,000 to 350,000 cP at a temperature of 8° C., and wherein the liquid cheese composition does not comprise diglycerides.

13. The liquid cheese composition according to claim 1, wherein the total fat/oil content of the liquid cheese composition is less than 19 wt % of the liquid cheese composition.

14. The liquid cheese composition according to claim 1 comprising 3.0-9.0 wt % of the vegetable oil.

15. The liquid cheese composition according to claim 1, wherein the total fat/oil content of the liquid cheese composition is less than 19 wt % of the composition.

16. The process according to claim 1, wherein homogenizing the mixture in step c) is at a temperature of at least 70° C.

17. The process according to claim 1, wherein homogenizing the mixture in step c) is at a temperature of up to 121° C.

* * * * *